United States Patent [19]
Tai

[11] Patent Number: 5,625,460
[45] Date of Patent: *Apr. 29, 1997

[54] METHOD AND APPARATUS FOR LOCALLY SWITCHING GRAY DOT TYPES TO REPRODUCE AN IMAGE WITH GRAY LEVEL PRINTING

[75] Inventor: Hwai T. Tai, Rochester, N.Y.

[73] Assignee: Eastman Kodak Company, Rochester, N.Y.

[*] Notice: The term of this patent shall not extend beyond the expiration date of Pat. No. 5,200,831.

[21] Appl. No.: 164,274

[22] Filed: Dec. 9, 1993

[51] Int. Cl.⁶ .................................................. H04N 1/23
[52] U.S. Cl. ........................ 358/298; 358/455; 358/456; 358/462
[58] Field of Search ................................. 358/296, 298, 358/455–466, 534–536

[56] References Cited

U.S. PATENT DOCUMENTS

| | | | |
|---|---|---|---|
| 4,593,325 | 6/1986 | Kannapell et al. | 358/466 |
| 4,741,046 | 4/1988 | Matsunawa et al. | 358/456 |
| 4,814,886 | 3/1989 | Kuge et al. | 358/298 |
| 5,075,780 | 12/1991 | Shibahara | 358/298 |
| 5,161,036 | 11/1992 | Mannichi et al. | 358/466 |

*Primary Examiner*—Stephen Brinich
*Attorney, Agent, or Firm*—Norman Rushefsky

[57] ABSTRACT

A method and arrangement for reproducing an original image scans an original image to digitize the image so as to produce a digitized image signal, and collects statistical information of dot regions from the digitized image signal. For each dot region of the digitized image signal, a dot type is selected to render that dot region in accordance with the statistical information, the dot type being either a mixed dot type or one of a fixed threshold or a dot type mathematically modified from said mixed dot type. A printer is controlled to print the digitized image signal by rendering the dot regions in accordance with the selected dot type for each dot region, so that an original image that may contain different types of image regions is satisfactorily reproduced. In order to reduce printer moire patterns indexes to the threshold masks may be modified to avoid rigid threshold mask patterns from being used.

18 Claims, 9 Drawing Sheets

FIG. 4

LEVEL 1
| 102 | 126 | 174 | 222 |
| 198 | (246) | 150 | (102) | 41 |
| 174 | 222 | 78 | 126 |
| 150 | 78 | 198 | 246 |

LEVEL 2
| 100 | 124 | 172 | 220 |
| 196 | 244 | 148 | 98 |
| 172 | 220 | 76 | 194 |
| 148 | 76 | 196 | 170 |
| | | | 146 |

LEVEL 3
| 98 | 122 | 170 | 218 |
| 194 | 242 | 146 | 74 |
| 170 | 218 | 74 | 98 |
| 146 | | | 194 |

LEVEL 4
| 96 | 120 | 168 | 216 |
| 192 | 240 | 144 | 72 |
| 168 | 216 | 72 | 120 |
| 144 | 96 | 192 | 240 |

LEVEL 5
| 94 | 118 | 166 | 214 |
| 190 | 238 | 142 | 70 |
| 166 | 214 | 70 | 118 |
| 142 | 94 | 190 | 238 |

LEVEL 6
| 92 | 116 | 164 | 212 |
| 188 | 236 | 140 | 68 |
| 164 | 212 | 68 | 116 |
| 140 | 92 | 188 | 236 |

LEVEL 7
| 90 | 114 | 162 | 210 |
| 186 | 234 | 138 | 66 |
| 162 | 210 | 66 | 114 |
| 138 | 86 | 184 | 234 |

LEVEL 8
| 88 | 112 | 160 | 208 |
| 184 | 232 | 136 | 64 |
| 160 | 208 | 64 | 112 |
| 136 | 88 | 184 | 232 |

LEVEL 9
| 86 | 110 | 158 | 206 |
| 182 | 230 | 134 | 62 |
| 158 | 206 | 62 | 110 |
| 134 | 86 | 182 | 230 |

LEVEL 10
| 84 | 108 | 156 | 204 |
| 180 | 228 | 132 | 60 |
| 156 | 204 | 60 | 108 |
| 132 | 84 | 180 | 228 |

LEVEL 11
| 82 | 106 | 154 | 202 |
| 178 | 226 | 130 | 58 |
| 154 | 202 | 58 | 106 |
| 130 | 82 | 178 | 226 |

LEVEL 12
| 80 | 104 | 152 | 200 |
| 176 | 224 | 128 | 56 |
| 152 | 200 | 56 | 104 |
| 128 | 80 | 176 | 224 |

LEVEL 13
| 26 | 44 | 48 | 52 |
| 50 | 54 | 46 | 40 |
| 48 | 52 | 42 | 44 |
| 46 | 40 | 50 | 54 |

LEVEL 14
| 26 | 28 | 32 | 36 |
| 34 | 38 | 30 | 24 |
| 32 | 36 | 26 | 28 |
| 30 | 24 | 34 | 38 |

LEVEL 15
| 10 | 12 | 16 | 20 |
| 18 | 22 | 14 | 8 |
| 16 | 20 | 8 | 12 |
| 14 | 18 | 10 | 22 |

LEVEL 16

|  | LEVEL 1 |  |  |  | LEVEL 2 |  |  |  | LEVEL 3 |  |  |  | LEVEL 4 |  |  |
|---|---|---|---|---|---|---|---|---|---|---|---|---|---|---|---|
| 132 | 150 | 186 | 222 | 127 | 145 | 181 | 217 | 122 | 140 | 176 | 212 | 116 | 134 | 170 | 206 |
| 204 | 240 | 168 | 114 | 199 | 235 | 163 | 109 | 194 | 230 | 158 | 104 | 188 | 224 | 152 | 98 |
| 186 | 222 | 132 | 150 | 181 | 217 | 127 | 145 | 176 | 212 | 122 | 140 | 170 | 206 | 116 | 134 |
| 168 | 114 | 204 | 240 | 163 | 109 | 199 | 235 | 158 | 104 | 194 | 230 | 152 | 98 | 188 | 224 |

|  | LEVEL 5 |  |  |  | LEVEL 6 |  |  |  | LEVEL 7 |  |  |  | LEVEL 8 |  |  |
|---|---|---|---|---|---|---|---|---|---|---|---|---|---|---|---|
| 111 | 129 | 165 | 201 | 105 | 123 | 159 | 195 | 100 | 118 | 154 | 190 | 94 | 112 | 148 | 184 |
| 183 | 219 | 147 | 93 | 177 | 213 | 141 | 87 | 172 | 208 | 136 | 82 | 166 | 202 | 130 | 76 |
| 165 | 201 | 111 | 129 | 159 | 195 | 105 | 123 | 154 | 190 | 100 | 118 | 148 | 184 | 94 | 112 |
| 147 | 93 | 183 | 219 | 141 | 87 | 177 | 213 | 136 | 82 | 172 | 208 | 130 | 76 | 166 | 202 |

|  | LEVEL 9 |  |  |  | LEVEL 10 |  |  |  | LEVEL 11 |  |  |  | LEVEL 12 |  |  |
|---|---|---|---|---|---|---|---|---|---|---|---|---|---|---|---|
| 89 | 107 | 143 | 179 | 83 | 101 | 137 | 173 | 78 | 96 | 132 | 168 | 72 | 90 | 126 | 162 |
| 161 | 197 | 125 | 71 | 155 | 191 | 119 | 65 | 150 | 186 | 114 | 60 | 144 | 180 | 108 | 54 |
| 143 | 179 | 89 | 107 | 137 | 173 | 83 | 101 | 132 | 168 | 78 | 96 | 126 | 162 | 72 | 90 |
| 125 | 71 | 161 | 197 | 119 | 65 | 155 | 191 | 114 | 60 | 150 | 186 | 108 | 54 | 144 | 180 |

|  | LEVEL 13 |  |  |  | LEVEL 14 |  |  |  | LEVEL 15 |  |  |  | LEVEL 16 |  |  |
|---|---|---|---|---|---|---|---|---|---|---|---|---|---|---|---|
| 40 | 41 | 44 | 47 | 24 | 25 | 28 | 31 | 9 | 10 | 13 | 16 |  |  |  |  |
| 46 | 49 | 43 | 38 | 30 | 33 | 27 | 22 | 15 | 18 | 12 | 7 |  |  |  |  |
| 44 | 47 | 40 | 41 | 28 | 31 | 24 | 25 | 13 | 16 | 9 | 10 |  |  |  |  |
| 43 | 38 | 46 | 49 | 27 | 32 | 30 | 33 | 12 | 15 | 7 | 18 |  |  |  |  |

LEVEL 1
| 161 | 173 | 197 | 221 |
| 209 | 233 | 185 | 149 |
| 197 | 185 | 161 | 209 |
| 185 | 149 | 173 | 233 |

LEVEL 2
| 154 | 166 | 190 | 214 |
| 202 | 226 | 178 | 142 |
| 190 | 214 | 154 | 166 |
| 178 | 142 | 202 | 226 |

LEVEL 3
| 145 | 157 | 181 | 205 |
| 193 | 217 | 169 | 133 |
| 181 | 205 | 145 | 157 |
| 169 | 133 | 193 | 217 |

LEVEL 4
| 136 | 148 | 172 | 196 |
| 184 | 208 | 160 | 124 |
| 172 | 196 | 136 | 148 |
| 160 | 124 | 184 | 208 |

LEVEL 5
| 127 | 139 | 163 | 187 |
| 175 | 199 | 151 | 115 |
| 163 | 187 | 127 | 139 |
| 151 | 115 | 175 | 199 |

LEVEL 6
| 118 | 130 | 154 | 178 |
| 166 | 190 | 142 | 106 |
| 154 | 178 | 118 | 130 |
| 142 | 106 | 166 | 190 |

LEVEL 7
| 109 | 121 | 145 | 169 |
| 157 | 181 | 133 | 97 |
| 145 | 169 | 109 | 121 |
| 133 | 97 | 157 | 181 |

LEVEL 8
| 100 | 112 | 136 | 160 |
| 148 | 172 | 124 | 88 |
| 136 | 160 | 100 | 112 |
| 124 | 88 | 148 | 172 |

LEVEL 9
| 91 | 103 | 127 | 151 |
| 139 | 163 | 115 | 79 |
| 127 | 151 | 91 | 103 |
| 115 | 79 | 139 | 163 |

LEVEL 10
| 82 | 94 | 118 | 142 |
| 130 | 154 | 106 | 70 |
| 118 | 142 | 82 | 94 |
| 106 | 70 | 130 | 154 |

LEVEL 11
| 73 | 85 | 109 | 133 |
| 121 | 145 | 97 | 61 |
| 109 | 133 | 73 | 85 |
| 97 | 61 | 121 | 145 |

LEVEL 12
| 64 | 76 | 100 | 124 |
| 112 | 136 | 88 | 52 |
| 100 | 124 | 64 | 76 |
| 88 | 52 | 112 | 136 |

LEVEL 13
| 37 | 38 | 40 | 42 |
| 41 | 43 | 39 | 36 |
| 40 | 42 | 37 | 38 |
| 39 | 36 | 41 | 43 |

LEVEL 14
| 21 | 22 | 24 | 26 |
| 25 | 27 | 23 | 20 |
| 24 | 26 | 21 | 22 |
| 23 | 20 | 25 | 27 |

LEVEL 15
| 7 | 8 | 10 | 12 |
| 11 | 13 | 9 | 6 |
| 10 | 12 | 7 | 8 |
| 9 | 6 | 11 | 13 |

LEVEL 16

|   | LEVEL 1 |     |     |     |     | LEVEL 2 |     |     |     |     | LEVEL 3 |     |     |     |     | LEVEL 4 |     |     |     |
|---|---------|-----|-----|-----|-----|---------|-----|-----|-----|-----|---------|-----|-----|-----|-----|---------|-----|-----|-----|
| 191 | 197 | 209 | 221 |     | 181 | 187 | 199 | 211 |     | 169 | 175 | 187 | 199 |     | 156 | 162 | 174 | 186 |
| 215 | 227 | 203 | 185 |     | 205 | 217 | 193 | 175 |     | 193 | 205 | 181 | 163 |     | 180 | 192 | 168 | 150 |
| 209 | 221 | 191 | 197 |     | 199 | 211 | 181 | 187 |     | 187 | 199 | 169 | 175 |     | 174 | 186 | 156 | 162 |
| 203 | 185 | 215 | 227 |     | 193 | 175 | 205 | 217 |     | 181 | 163 | 193 | 205 |     | 168 | 150 | 180 | 192 |

|   | LEVEL 5 |     |     |     |     | LEVEL 6 |     |     |     |     | LEVEL 7 |     |     |     |     | LEVEL 8 |     |     |     |
|---|---------|-----|-----|-----|-----|---------|-----|-----|-----|-----|---------|-----|-----|-----|-----|---------|-----|-----|-----|
| 144 | 150 | 162 | 174 |     | 131 | 137 | 149 | 161 |     | 119 | 125 | 137 | 149 |     | 106 | 112 | 124 | 136 |
| 168 | 180 | 156 | 138 |     | 155 | 167 | 143 | 125 |     | 143 | 155 | 131 | 113 |     | 130 | 142 | 118 | 100 |
| 162 | 174 | 144 | 150 |     | 149 | 161 | 131 | 137 |     | 137 | 149 | 119 | 125 |     | 124 | 136 | 106 | 112 |
| 156 | 138 | 168 | 180 |     | 143 | 125 | 155 | 167 |     | 131 | 113 | 143 | 155 |     | 118 | 100 | 130 | 142 |

|   | LEVEL 9 |     |     |     |     | LEVEL 10 |     |     |     |     | LEVEL 11 |     |     |     |     | LEVEL 12 |     |     |     |
|---|---------|-----|-----|-----|-----|----------|-----|-----|-----|-----|----------|-----|-----|-----|-----|----------|-----|-----|-----|
| 94  | 100 | 112 | 124 |     | 81  | 87  | 99  | 111 |     | 69  | 75  | 87  | 99  |     | 56  | 62  | 74  | 86  |
| 118 | 130 | 106 | 88  |     | 105 | 117 | 93  | 75  |     | 93  | 105 | 81  | 63  |     | 80  | 92  | 68  | 50  |
| 112 | 124 | 94  | 100 |     | 99  | 111 | 81  | 87  |     | 87  | 99  | 69  | 75  |     | 74  | 86  | 56  | 62  |
| 106 | 88  | 118 | 130 |     | 93  | 75  | 105 | 117 |     | 81  | 63  | 93  | 105 |     | 68  | 50  | 80  | 92  |

|   | LEVEL 13 |     |     |     |     | LEVEL 14 |     |     |     |     | LEVEL 15 |     |     |     |     | LEVEL 16 |
|---|----------|-----|-----|-----|-----|----------|-----|-----|-----|-----|----------|-----|-----|-----|-----|----------|
| 35 | 35 | 36 | 37 |     | 19 | 19 | 20 | 21 |     | 6 | 6 | 7 | 8 |     |   |
| 37 | 38 | 36 | 34 |     | 21 | 22 | 20 | 18 |     | 9 | 9 | 7 | 5 |     |   |
| 36 | 37 | 35 | 35 |     | 20 | 21 | 19 | 19 |     | 8 | 8 | 6 | 6 |     |   |
| 36 | 34 | 37 | 38 |     | 20 | 18 | 21 | 22 |     | 5 | 7 | 8 | 9 |     |   |

FIG. 7

| LEVEL 1 | | | | | LEVEL 2 | | | | | LEVEL 3 | | | | | LEVEL 4 | | | |
|---|---|---|---|---|---|---|---|---|---|---|---|---|---|---|---|---|---|---|
| 220 | 220 | 220 | 220 | 220 | 208 | 208 | 208 | 208 | 208 | 192 | 192 | 192 | 192 | 192 | 176 | 176 | 176 | 176 |
| 220 | 220 | 220 | 220 | 220 | 208 | 208 | 208 | 208 | 208 | 192 | 192 | 192 | 192 | 192 | 176 | 176 | 176 | 176 |
| 220 | 220 | 220 | 220 | 220 | 208 | 208 | 208 | 208 | 208 | 192 | 192 | 192 | 192 | 192 | 176 | 176 | 176 | 176 |
| 220 | 220 | 220 | 220 | 220 | 208 | 208 | 208 | 208 | 208 | 192 | 192 | 192 | 192 | 192 | 176 | 176 | 176 | 176 |

| LEVEL 5 | | | | | LEVEL 6 | | | | | LEVEL 7 | | | | | LEVEL 8 | | | |
|---|---|---|---|---|---|---|---|---|---|---|---|---|---|---|---|---|---|---|
| 160 | 160 | 160 | 160 | 160 | 144 | 144 | 144 | 144 | 144 | 128 | 128 | 128 | 128 | 128 | 112 | 112 | 112 | 112 |
| 160 | 160 | 160 | 160 | 160 | 144 | 144 | 144 | 144 | 144 | 128 | 128 | 128 | 128 | 128 | 112 | 112 | 112 | 112 |
| 160 | 160 | 160 | 160 | 160 | 144 | 144 | 144 | 144 | 144 | 128 | 128 | 128 | 128 | 128 | 112 | 112 | 112 | 112 |
| 160 | 160 | 160 | 160 | 160 | 144 | 144 | 144 | 144 | 144 | 128 | 128 | 128 | 128 | 128 | 112 | 112 | 112 | 112 |

| LEVEL 9 | | | | LEVEL 10 | | | | LEVEL 11 | | | | LEVEL 12 | | | | |
|---|---|---|---|---|---|---|---|---|---|---|---|---|---|---|---|---|
| 96 | 96 | 96 | 96 | 80 | 80 | 80 | 80 | 64 | 64 | 64 | 64 | 48 | 48 | 48 | 48 | |
| 96 | 96 | 96 | 96 | 80 | 80 | 80 | 80 | 64 | 64 | 64 | 64 | 48 | 48 | 48 | 48 | |
| 96 | 96 | 96 | 96 | 80 | 80 | 80 | 80 | 64 | 64 | 64 | 64 | 48 | 48 | 48 | 48 | |
| 96 | 96 | 96 | 96 | 80 | 80 | 80 | 80 | 64 | 64 | 64 | 64 | 48 | 48 | 48 | 48 | |

| LEVEL 13 | | | | LEVEL 14 | | | | LEVEL 15 | | | | LEVEL 16 |
|---|---|---|---|---|---|---|---|---|---|---|---|---|
| 32 | 32 | 32 | 32 | 16 | 16 | 16 | 16 | 4 | 4 | 4 | 4 | |
| 32 | 32 | 32 | 32 | 16 | 16 | 16 | 16 | 4 | 4 | 4 | 4 | |
| 32 | 32 | 32 | 32 | 16 | 16 | 16 | 16 | 4 | 4 | 4 | 4 | |
| 32 | 32 | 32 | 32 | 16 | 16 | 16 | 16 | 4 | 4 | 4 | 4 | |

|   | 1 | 2 | 3 | 4 |
|---|---|---|---|---|
| 1 | 191 | 197 | 209 | 221 |
| 2 | 215 | 227 | 203 | 185 |
| 3 | 209 | 221 | 191 | 197 |
| 4 | 203 | 185 | 215 | 227 |

METHOD AND APPARATUS FOR LOCALLY SWITCHING GRAY DOT TYPES TO REPRODUCE AN IMAGE WITH GRAY LEVEL PRINTING

FIELD OF THE INVENTION

The present invention relates to the field of encoding pictorial imagery for reproduction on display or printing systems, and more particularly, to selecting a dot type in a display or printing arrangement that uses gray level display/printing.

BACKGROUND OF THE INVENTION

In the area of digital printing (the term "printing" is used to encompass both printing and displaying throughout), gray level has been achieved in a number of different ways. The representation of the intensity, i.e., the gray level, of a color by binary displays and printers has been the object of a variety of algorithms. Binary displays and printers are capable of making a mark, usually in the form of a dot, of a given, uniform size and at a specified resolution in marks per unit length, typically dots per inch. It has been common to place the marks according to a variety of geometrical patterns such that a group of marks when seen by the eye gives a rendition of an intermediate color tone between the color of the background (usually white paper stock) and total coverage, or solid density.

Continuous tone images contain an apparent continuum of gray levels. As an approximation to continuous tone images, pictorial imagery has been represented via binary halftone technologies. In order to record or display a halftone image with a scanning system, one picture element of the recording or display surface consists of a j×k matrix of sub-elements where j and k are positive integers. A halftone image is reproduced by printing the respective sub-elements or leaving them blank, in other words, by suitably distributing the printed marks.

Halftone image processing algorithms are evaluated in part, by their capability of delivering a complete gray scale at normal viewing distances. The capability of a particular process to reproduce high frequency rendition (fine detail) with high contrast modulation makes that procedure superior to one which reproduces such fine detail with lesser or no output contrast.

Another method of producing gray levels is provided by gray level printing. In such a method, each pixel has the capability to render several different dot sizes. The dot size for a pixel is a function of the exposure time provided an LED element corresponding to that pixel. For example, in some systems the longer the exposure time, the more toner is attracted to that particular pixel.

There are two major concerns in rendering a continuous tone image for printing: (1) the resolution of image details, and (2) the reproduction of gray scales. In a binary halftone representation scheme, these two fundamental factors compete with each other. The more gray levels that are rendered, the larger is the halftone cell. Consequently, coarse halftone line screens are provided, with the attendant poor image appearance. Hence, a compromise is made in rendering between the selection of line resolution and gray scales in binary halftone printing. However, in gray level halftone printing, one can satisfy both resolution and gray level requirements. In gray level printing, the same number of addressable dots are present, and there is a choice of dot sizes from one dot-size of 1 bit/pixel (the binary example) to 16 different dot-sizes of 4 bits/pixel. An image could then be rendered for example with 133 line screens per inch and 128 gray scales of higher quality image. Although providing higher image quality with respect to line resolution and tonal scales, gray level halftoning presents its own dot rendering issues.

A problem exists in the application of a gray level rendering technique to a document that contains different types of images: text, halftone, and continuous tone. These different types of images create different rendering problems, based on a trade-off between tone scales and detail resolution. For example, with text, the number of tone scales is not as important as providing a smooth text edge, whereas the opposite holds true for continuous tone images. Providing a single type of gray level halftone rendering technique to a document that contains two or more types of images may lead to the production of a document in which one or more of the different types of images are reproduced unsatisfactorily.

When scanning a document, image processing techniques have been applied to convert a gray scale image into an image representation which a printer can accept (either binary format or gray level format). In this scanning process, text areas, line drawing and halftone pictures are indistinguishable from each other, and all appear to be a gray scale image. An improper conversion process creates artifacts in the hardcopy such as a jagged boundary in the text area, or a Moire pattern in the halftone region. To overcome this, intelligent processes have been developed to segment the image into different regions of text, line drawing, and picture. Different conversion processes for the individual segments were then applied to these segments to restore the original document. However, these segmentation and conversion processes unduly complicate the digital copying process.

In my U.S. Pat. No. 5,200,831, the contents of which are incorporated herein by this reference, there is described a unified rendering method and apparatus using gray level printing that will satisfactorily reproduce an image that contains text, line drawing, halftone and/or continuous tone regions, with different gray dot representations selected for regions meeting a defined criteria without the need to particularly investigate definitively for specific type of region.

In this patent there is described a method of reproducing an original image comprising the step of scanning an original image to digitize the image so as to produce a digitized image signal, and collecting statistical information of dot regions from the digitized image signal. For each dot region of the digitized image signal, a dot type is selected to render that dot region in accordance with the statistical information, the dot type being either a mixed dot type or a fixed threshold type. A gray level printer is controlled to print the digitized image signal by rendering the dot regions in accordance with the selected dot type for each dot region.

The fixed threshold type dot provides very good rendering of text and halftone, and will not cause Moire in the halftone while producing a smooth text boundary. The mixed dot provides very good rendering for continuous tone regions. By collecting statistical information and then locally selecting the appropriate dot type from between the fixed threshold type and the mixed dot type, a superior reproduction of an image that contains different types of image regions, such as text, halftone and continuous tone regions is achieved.

The fixed threshold dot type is rendered by comparing the gray level of the scanned dot typically represented by an 8-bits per pixel value from 0–255 with each of 15 threshold values (4 bits/pixel printing system) and selecting a gray level representing the closest threshold value to render the dot. A characteristic of the fixed threshold type dot is that each scanned pixel has its corresponding printed gray level determined by the same set of 15 threshold values (see FIG. 8). Thus, 15 levels of gray are realizable at the local pixel level but larger levels of gray are not provided since this type of dot does not contemplate clusters of pixels arranged as cells and the higher numbers of gray levels realizable by such cells albeit at lower resolutions.

The mixed dot type described in the aforementioned patent builds on the capability of a gray level printer to render several dot sizes.

As noted above, in gray level printing, each pixel has the capability to be rendered in several different dot sizes, and thus different gray levels. However, instead of simply providing each pixel with an independent gray level, several pixels may be organized together to form a superpixel, or cell. Each of the pixels in a cell is then provided with a gray level. The human visual response integrates the various gray levels of the individual pixels in the cell to a single perceived gray level for the cell. This is similar to the basic concept of binary halftoning. The number of tone scales for a cell is increased greatly, however, due to the number of different gray levels available for each pixel. For example, instead of only the two levels provided in binary halftoning for each pixel, fifteen levels can be provided with gray level printing for each pixel in a cell (4 bits/pixel). When the cell is made up of 8 pixels, such as outlined cell 10 in FIG. 3, for example, the gray level printing allows 121 different gray shades (including 0) to be rendered for that cell.

The formation of the dots in the pixels of a cell can be performed in a number of different ways to achieve different desired results. The growth pattern for the dots can be formed as "full" dot, "partial" dot, or "mixed" dot to provide gray level halftoning.

The growth pattern of gray levels in cell 10 grows in accordance with that of the so-called mixed dot type. The mixed dot type in-turn is a hybrid of the full dot type and partial dot type growth patterns. In the full dot type growth pattern, increases in cell gray level are rendered by increases in gray level at a single pixel location within the cell until the maximum gray level for that pixel is realized. The next series of higher gray levels for the cell are realized by increases in gray level at an adjacent cell location and so on. Thus, in the full dot type the lower cell gray levels tend to be concentrated near the center of the cell. Compare this with the partial dot type cell growth pattern wherein increases in cell gray level are more distributed throughout the entire cell. Thus, for a partial dot type growth pattern, cell gray level 5 would be rendered by a gray level of one at 5 pixel locations within the cell whereas in the full dot type, a cell gray level of 5 is rendered by one pixel location in the cell having a gray level of 5 and all the others are 0.

In the electrophotographic process, the full dot type formation process is favored because it forms stable dots and exhibits less granularity (halftone printing noise). The partial dot method, however, carries more information detail than full dot, but at the cost of less stable dots.

As noted in the aforementioned patent, the mixed dot type cell combines the merits of both the full dot and the partial dot types in gray level halftoning. A number of different processes can be provided to combine the full dot type and the partial dot type, with the specific mixed dot type being chosen based on which renders an image with more smoothness, less graininess, and more image details. Suggested strategies are: 1) build small stable dots in the highlight (toe) region; 2) keep tone response linear in the mid-tone region; 3) reduce dot structure in the shadow (shoulder) region and render more details. Based on these considerations, a specific mixed dot type is chosen to optimize stable dots, more image detail and less graininess.

An example of a specific mixed dot type 3-bit gray halftone dot layout is illustrated in FIG. 3. As can be seen, until gray level 96 is reached, the pixels are constrained from growing beyond dot-size of 12. The pixels grow in a full dot type process, with the pixel circled growing to a dot size of 12 for cell gray levels 1 through 12. For higher cell gray levels the pixel location 30 that is squared then starts to grow in size. Note that this is a 4-bits/pixel system and that the maximum density or dot size at a pixel location is 15. Thus, when the cell gray level is to be 12, it is rendered by a pixel of size or density 12 at the circled location. However, a cell gray level of 13 is rendered by a pixel of density 12 at the circled location and a pixel of density one at the squared location. Once all of the pixels in the cell have attained a dot size of 12, corresponding to cell gray level 96, the cell then increases in gray level by using a partial dot type process. In other words, each of the pixels in the cell must grow to a dot size of 12 before any of the pixels begins growing to a dot size of 13. Thereafter, increases in cell gray level are incrementally and orderly dispersed through the cell. For example, cell grey level 98 results from two pixels in the cell being grey level 13 and 6 pixels being grey level 12.

As noted above and with reference to FIG. 8, another type of rendering technique is the fixed threshold method. In this method each individual pixel is rendered with only limited tone scales. For example, 4 bits/pixel renders 16 different tone shades, including 0. The fixed threshold type renders the highest resolution among the various types, and an edge can be rendered more accurately down to each pixel. The fixed threshold type renders an image with even higher sharpness than the partial dot type since it is not limited by the cell size as is the partial dot type. The problem with the fixed threshold type is that it has less tone scales, so that a false contour could easily be seen in the rendered image. However, the fixed threshold type will provide excellent rendering results on text and halftone originals.

Although any one of the three dot types (full, partial or mixed) could be used to produce a satisfactory continuous tone image, the mixed dot type is the best choice for continuous tone rendering. As stated above, the fixed threshold type renders well on both text and halftone. The unified rendering technique of the invention disclosed in the aforementioned patent uses both fixed threshold type and mixed dot types according to local image content so that text, halftone and continuous tone images are all reproduced well.

SUMMARY OF THE INVENTION

The invention herein is based on the realization that hard switching between a mixed dot type thresholding pattern and a fixed threshold type pattern can create artifacts and it is therefore an object of the invention to provide a method and apparatus for image processing that tends to reduce such artifacts.

In accordance with the invention, there is provided a method and apparatus of reproducing an original image, comprising: scanning an original image to digitize the image so as to produce a digitized image signal; analyzing information about a dot region from the digitized image signal; for each dot region of the digitized image signal, selecting a dot type to render that dot region in accordance with the information, the dot type being either a mixed dot type, a fixed threshold dot type or a dot type mathematically modified from said mixed dot type; and rendering the dot regions in accordance with the selected dot type for each dot region.

In accordance with another aspect of the invention, there is provided a method of reproducing an original image, comprising: scanning an original image to digitize the image so as to produce a digitized image signal; for a dot region of the digitized image signal selecting a threshold mask having a set of different threshold values wherein an index is associated with the threshold mask and the index changes from dot region to dot region to point to different starting threshold values in the set; and rendering the dot regions in accordance with a comparison of the digitized image signal and threshold values in the set.

BRIEF DESCRIPTION OF THE DRAWINGS

FIG. 4 illustrates a thresholding mask for a 4-bit gray halftone dot layout according to the mixed dot type as described in my aforementioned patent.

FIGS. 5, 6 and 7 illustrate different mixed dot thresholding masks in accordance with the invention.

FIG. 8 illustrates a thresholding mask for a 4-bit gray halftone dot layout according to the fixed threshold dot type as described in my aforementioned patent.

FIG. 9 illustrates a fixed or rigid thresholding matrix pattern of the dot type shown in FIG. 7.

FIG. 10a illustrates a mathematically or pseudo-randomly modified thresholding matrix pattern of that shown in FIG. 9.

FIG. 10b illustrates a matrix of index values for the randomly changing indexes shown in FIG. 10a.

Other objects, advantages and novel features of the present invention will become apparent from the following detailed description of the invention when considered in conjunction with the accompanying drawings.

DETAILED DESCRIPTION OF THE DRAWINGS

Figure 1:
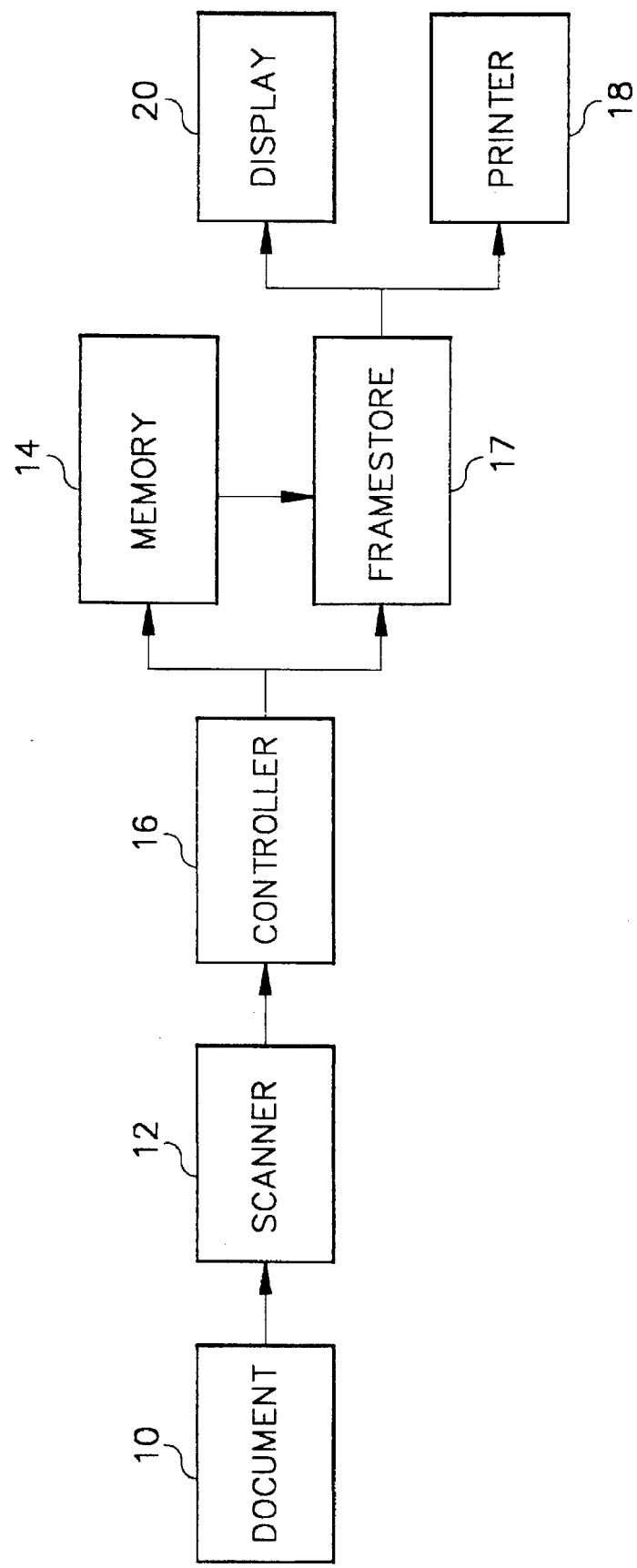
FIG. 1 shows a block diagram of an apparatus for reproducing an image, constructed in accordance with an embodiment of the present invention.
Figure 2:
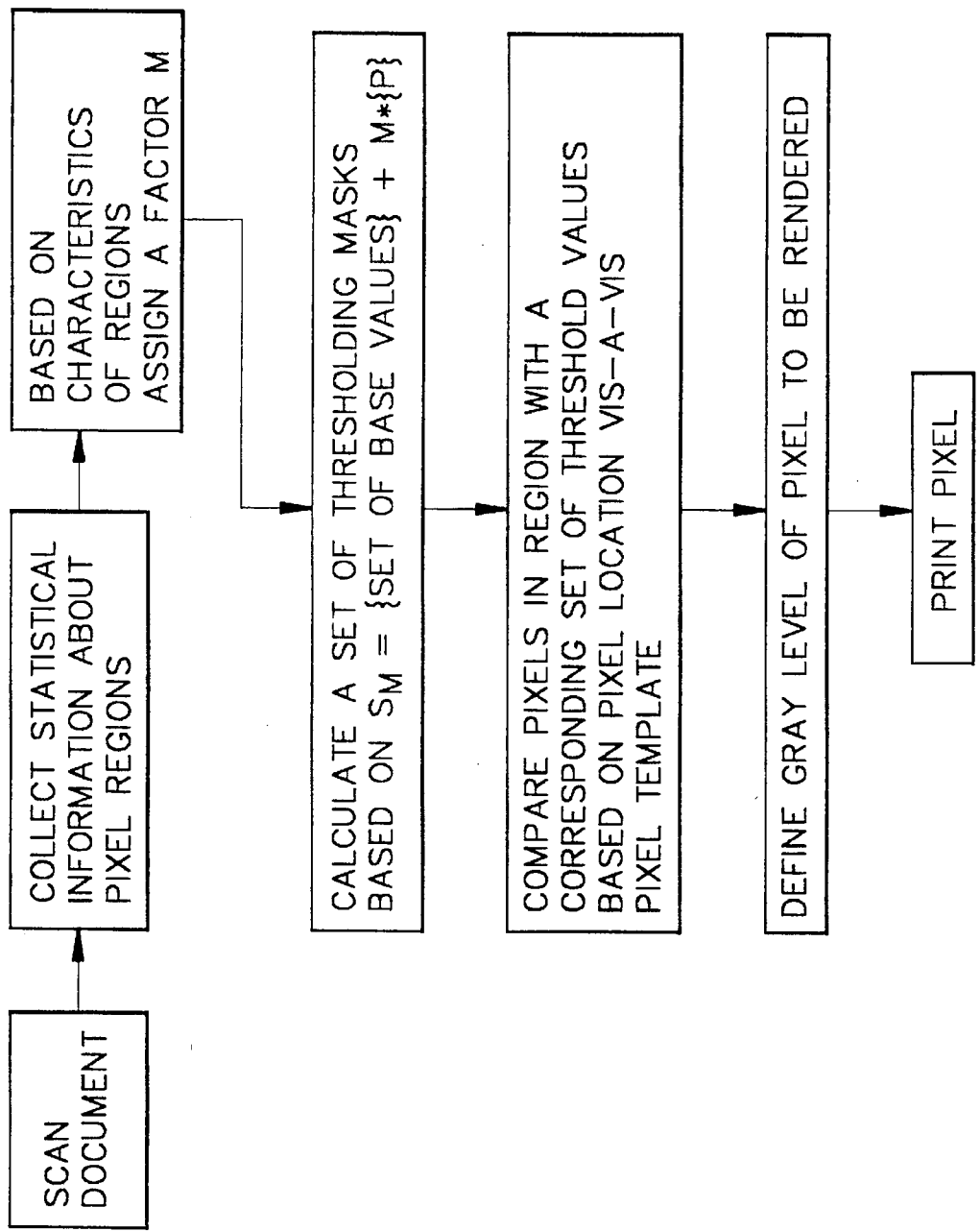
FIG. 2 shows an improved method for unified image rendering in accordance with an embodiment of the present invention.

FIG. 1 illustrates an arrangement which reproduces a document. The document 10 can contain different types of images on the same document. For example, document 10 may contain both text and continuous tone areas, and may also contain halftone areas.

The document 10 is scanned in and digitized by a conventional scanner 12, which operates to provide digital signals representative of the densities of the areas of the document 10 corresponding to a pixel. These signals are sent to a memory (or buffer) 14. Under the direction of a controller 16, these signals may be modified and provided as gray level signals through a framestore 17 to a printer 18 and/or a display 20 for each pixel. The printer 18 and/or display 20 will then reproduce the document 10 by energizing each of the individual pixels according to the gray levels as modified (or not modified) by the controller 16. The memory 14, the controller 16, the framestore 17, the printer 18 and the display 20 are of conventional hardware design.

The controller 16 of the present invention operates to modify the gray level that is to be printed for a pixel in dependence on the local contrast. In providing a gray level signal for a specific pixel to be printed, the controller 16 will select between a "mixed dot" type rendering technique and a "fixed threshold" type rendering technique. Before describing the selection process, these two rendering techniques will now be discussed further.

The multi-bit rendering method disclosed in U.S. Pat. No. 5,200,831 switches between gray dot types when rendering documents of different image types. Thus, a document sheet to be reproduced may contain text, graphics and/or picture information. The rendering method disclosed switches the dot pattern according to the document's local image statistics.

The method and apparatus described herein are related to and extend the rendering method of U.S. Pat. No. 5,200,831 to multi-types of dot patterns. The construction of these multi-types of dot patterns are disclosed below. The rendered image will have smooth switching dots among different dot patterns due to its capability to create accordingly.

Figure 3:
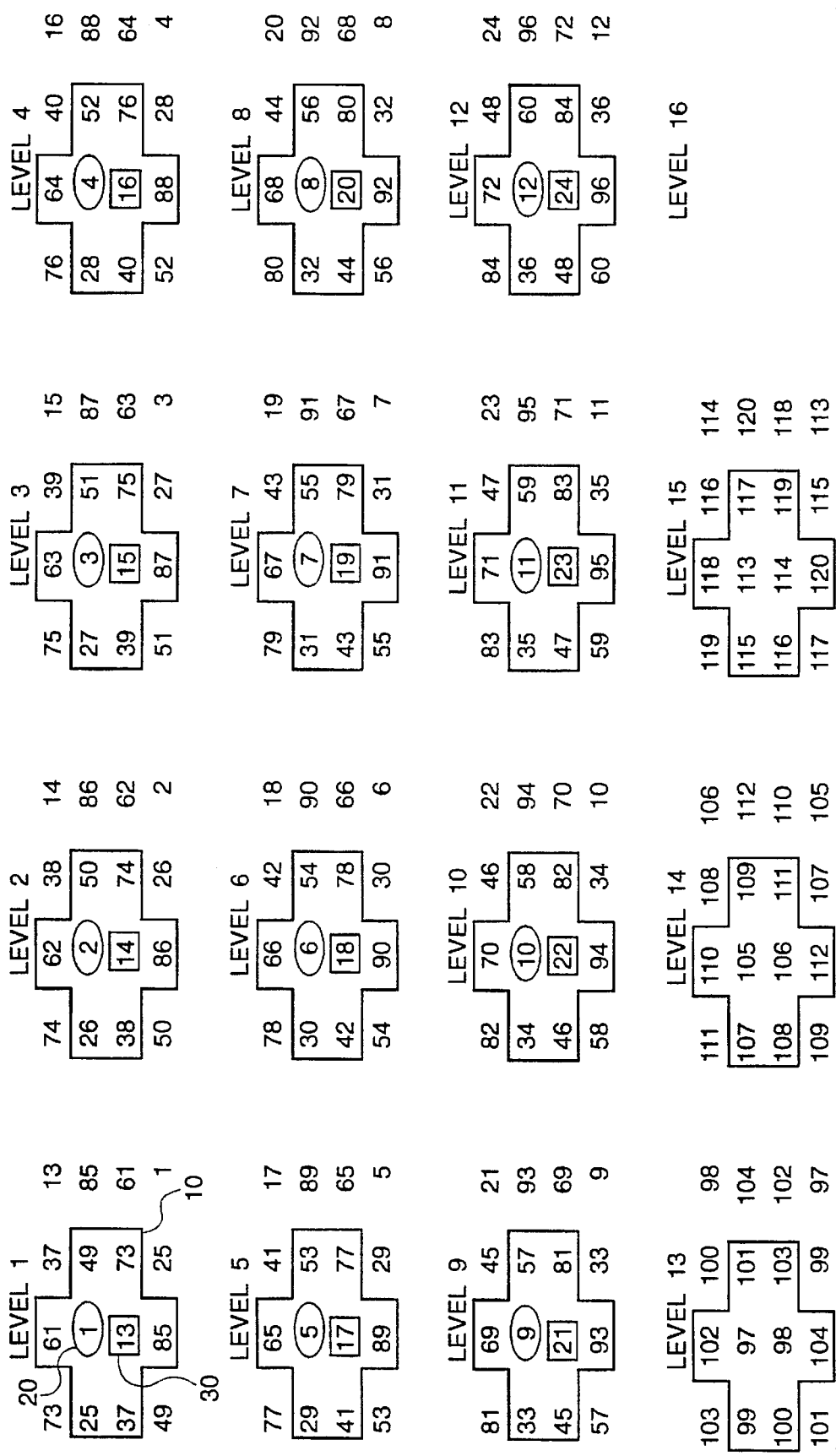
FIG. 3 illustrates an exemplary 4-bits per pixel gray halftone dot layout according to a mixed dot type growth pattern.

The invention of this new method and apparatus will be described with reference to 141 lines per inch (LPI) halftone screen with the specific 4-bit mixed dot type pattern. However, this is just illustrated as an example. Consider now the 4-bit mixed dot type pattern which is shown similarly in U.S. Pat. No. 5,200,831 and is illustrated in FIG. 3. This gray scale dot type has 120 different dot patterns, represents 141 LPI screen, 45 degree orientation, at 400 dpi resolution. There are 15 threshold levels in the 4-bit representation. The corresponding thresholding value of the mixed dot pattern is illustrated in FIG. 4.

Assume, in this example, that the scanner 12 operates also at 400 dpi resolution and in scanning pixels on a document 10 will generate values of density from 0 (full black) to 255 (white) and represent same as an 8 bits/pixel value. Note, too, that this value may be determined after correction for scanner calibration errors and other processing including color processing of the scanned pixels. The threshold values represent a 4×4 mask of repeating values. The scanned pixel is associated with a particular location in this 4×4 mask. Assume further that an incoming scanned pixel value for a current pixel is associated with a location 40 which is the upper left corner position of the 4×4 threshold mask in FIG. 4. The 15 threshold values for this location are respectively from levels 1 through 15; 102, 100, 98, 96, 94, 92, 90, 88, 86, 84, 82, 80, 42, 26 and 10. While this current pixel is not part of illustrated cell 10 in FIG. 4, it is part of an adjacent cell and is in the same 4×4 dot region. The cells are useful in facilitating understanding of the growth pattern of how apparent gray levels of pixel clusters are realized but play no role once the thresholding mask values are defined and actual determinations of gray level for each current pixel value is compared with the set of 15 threshold values to determine which is closest. Thus, hereinafter discussion will be had with regard also to dot regions which are described as containing 16 pixels in a 4×4 matrix, but it will be appreciated that other matrix sizes are also contemplated, for example, 6×6 or 8×8. Assuming the scanned pixel value is 93, it will be rendered as either a level 5 or level 6 size or density dot. The algorithm is provided with a selection bias for determining which, in the event of a tie.

As illustrated in FIG. 4, a different set of thresholding values are arranged for each specific location in a cell 10 which repeat in the 4×4 dot region. For example, at thresholding value level 1, the corresponding thresholding values of cell 10 (and the 4×4 dot region of which the cell is apart) are in the set S1=(102, 126, 174, 222, 198, 246, 150, 78). There are a total of 15 different sets, S={S1, S2, . . . , S15} for the 4-bit representation of cell 10 in FIG. 4. The values in a set at each thresholding value level can be represented in the form as:

S=Base_Value+M*(Thresholding value–Base_Value)   Equation 1

The Base_Value is set to a different value at different thresholding value levels 1 through 15. For example, at threshold value level 1, the threshold value for location 41 is 102, Base_Value for the cell 10 is 220, and M is 100%, then one of the values in S1 is 220+100%*(102−220)=102

A new set P1, evolved from S1, represents the difference between the thresholding value and the Base_Value; i.e., it represents the factor in the parenthesis of Equation 1. For example, for cell 10 at level 1, the set P1 is:

P1=(−118, −94, −46, 2, −22, 26, −70, −142)

If the factor M is given 100%, then the original set S1 can be reconstructed from P1 assuming that the Base_Value for S1 is known.

The new set P={P1, P2 . . . , P15} has thus evolved from the set S={S1, S2, . . . , S15} for the 4-bit representation. The set S can be fully reconstructed back from the set P with M=100% or 1. However, the set P associated with different M value settings will create different sets of S.

We will now distinguish between these sets of S by a subscript representing its corresponding value M. For the previous example the set S will now be referred to as $S_{100}$ because the value M is set at 100% which renders with the original designed gray scale dot in accordance with the mask of FIG. 4. Interestingly, when value M is set at 0%, the threshold mask becomes similar to the multi-level fixed threshold dot type since there is only one threshold value for the cell at each threshold level as illustrated in FIG. 8. In fact, if the Base_Value is set properly at each of the 15 levels, the set $S_0$ is identical to the Base_Values at each of the threshold value levels. As noted above, the two dot types of FIGS. 4 and 8 are equivalent to the dot types disclosed in U.S. Pat. No. 5,200,831. However, other M values could be set in between 0% and 100% and as a result numerous different dot types will be created. Furthermore, those different dot types are gradually varied during rendering of a document containing changes in contrast from 0% and 100% even though 0% and 100% are two completely different dot types. Thus, numerous dot types, through adjusting M values, could be rendered in the image without hard switching only between dot types of FIG. 4 and FIG. 8. Thus, generally there is provided a set of sets of threshold values $S_M$=the set {$S_M1$, $S_M2$, . . . , $S_Mn$} wherein $S_Mn$=Base_Value$_n$+M*Pn wherein n is related to the number of gray values, i.e., n=15 for a four-bit system and wherein 0<M<1 for the modified type dot.

In the image rendering algorithm, the M parameter could be adjusted according to some imaging criteria, the multi-types of dot patterns will therefore be blended in different areas of image. For example, the value M is adjusted according to local image contrast or local image structure of the image. Hence, a mixed type document could be handled through this multi-types dot pattern rendering method. In the implementation, the parameter M can be selected for example {0%, 25%, 50%, 75%, 100%} as five distinct values. Therefore, five different dot type patterns, as defined by masks in FIGS. 4–8 can be used in rendering the five identified different classes of images determined through an image segmentation or region building process. Otherwise, if the value M is adjusted continuously, then many more dot type patterns can be used.

Thus, for example, scanned pixels may be grouped or classified into segments or regions in accordance with techniques described in commonly assigned U.S. application Ser. No. 07/877,353 now U.S. Pat. No. 5,471,543 and the regions rendered by identifying a value M associated with that region. A threshold mask set of values for rendering pixels in that region is then developed in accordance with the calculations and examples set forth herein and pixels rendered or printed by comparison with a set of pixel values associated with their respective locations.

In lieu of building regions into segments and then classifying the segments for type of rendering, the invention may adjust dot types on a dot region basis. A dot region may be a 4×4, 6×6 or 8×8 cluster of pixels. Within this "dot region" a local image statistic such as contrast, edges or image structure may be calculated. It can be classified into M classes (for example, M=5 as illustrated) according to the calculated contrast, edges or image structure value. The "dot region" being classified may be either TEXT or HALFTONE or a CONTONE region and thus of different image types. However, the algorithm of the invention need not be concerned with which image type the "dot region" belongs to. It doesn't build regions explicitly from the algorithm itself. As "dot region" is classified on the fly, a larger region of the same class is built implicitly with an associated dot type rendered there.

As noted above, the invention finds utility in conjunction with various image segmentation methods wherein regions with similar image properties may be classified or formed in the image. Each region is identified and further labeled with one image type, for example, a text image region or a halftone image region or a contone image region. Three dot types could be properly designed for three identified classes or regions. The detail of the region building process is not important in this rendering method except to select and to match the M dot types to M different regions. Classification of regions with a correct semantic meaning may require a higher level human cognition, at times it may be difficult for an image algorithm to abstract this information from the image pixel information only. Some classification errors might happen and cause a wrong image type to be assigned. Misclassification may be visible in the rendered image as artifacts if each dot type has a different internal structure of growth pattern. However, several dot types, as suggested, with slight variation among each other will minimize the impact of artifacts caused by misclassification.

The improved method and apparatus reduces artifacts resulting from fast switching between two distinct dot types described in my U.S. Pat. No. 5,200,831. To prevent such switching artifacts, M dot types gradually vary among each other to properly render the image. However, the criteria for switching is similar to that noted in my aforementioned U.S. patent, for example, switching may be based on the contrast, edges or local structure. However, since more dot types are provided, a finer range of parameters is used to determine switching. Thus, a text image type may have two or three similar dot types rendered. Similarly, the halftone image types and the CONTONE image types will have multiple dot types being rendered. The switching artifacts are thus minimized in each image type.

In accordance with the method and apparatus of the invention, the data for the threshold masks can be precalculated and stored in a ROM memory or they may be calculated once and stored in a RAM memory or they may be calculated on the fly based on each "dot region". Because the dot patterns described above are rigid dot patterns there may be created Moire artifacts; i.e., so called "Printer Moire" which is caused by the interaction of a rendered dot pattern with an original halftone dot structure in the halftone image. To reduce these Moire artifacts in the halftone image, the disclosed method and apparatus can be further modified.

As an example, consider the case where the M=25% dot type as illustrated in FIG. 7 is used to render a halftone image. The index to this 4×4 dot pattern is fixed. This index starts from the upper left corner (1,1) position and repeats every 4×4 pixels. It can be seen from FIG. 9 that the pattern of the sequence of values from the highest value to the lowest value is fixed or rigid within the 4×4 pixels. This patterns repeats itself from cell to cell if the index is fixed and may interact with the dot structure in a halftone original.

However and with reference to FIG. 10, if the index is being modulated pseudo-randomly the pattern as seen in the illustration will be broken up and not repeated across the 4×4 pixels. Hence, it will not result in Moire artifacts. The implementation of obtaining the index can be made using either a random number/generator for a starting index value or by modulating the starting index with some, for example, SINE/COSINE, waveforms. By introducing this randomness of selecting the starting index value in the multidot types described herein there is further provided immunization of Moire artifacts caused by pattern interaction.

A printer may either incorporate in memory all the possible thresholding masks or generate them as each current pixel scanned value is being evaluated for thresholding.

The invention has been described in detail with particular reference to preferred embodiments thereof and illustrative examples, but it will be understood that variations and modifications can be effected within the spirit and scope of the invention.

What is claimed:

1. A method of reproducing an original image, comprising:

scanning an original image to digitize the image so as to produce a digitized image signal;

collecting statistical information of dot regions from the digitized image signal;

for each dot region of the digitized image signal, selecting a dot type to render that dot region in accordance with the statistical information, the dot type being either a mixed dot type or a fixed threshold dot type or a dot type mathematically modified from said mixed dot type; and controlling a printer to print the digitized image signal by rendering the dot regions in accordance with the selected dot type for each dot region.

2. The method of claim 1, wherein the statistical information collected for a dot region includes information relating to at least one of contrast, variance, variation or roughness for that dot region.

3. The method of claim 2, wherein the fixed threshold type is selected for dot regions in which the contrast or variance is above a specified value, and the mixed dot type is selected for dot regions in which the contrast or variance is below a specified value.

4. An apparatus for reproducing an original image, comprising:

a scanner which scans and digitizes the original image into pixels;

a controller coupled to the scanner to receive the digitized original image, and which produces a first signal corresponding to said digitized original image; and a printer coupled to the controller to receive said first signal and which produces on a recording medium a reproduction of the original image;

wherein said controller includes:

means for collecting statistical information of dot regions from the first signal;

means for selecting for each dot region of the first signal a dot type to render that dot region in accordance with the statistical information, the dot type being either a mixed dot type, a fixed threshold dot type or a dot type mathematically modified from said mixed dot type; and means for controlling a printer to print the reproduction of the original image by rendering the dot regions of the first signal in accordance with the selected dot type for each dot region.

5. A method of reproducing an original image, comprising:

scanning an original image to digitize the image so as to produce a digitized image signal; analyzing information about a dot region from the digitized image signal;

for each dot region of the digitized image signal, selecting a dot type to render that dot region in accordance with the information, the dot type being either a mixed dot type, a fixed threshold dot type or a dot type mathematically modified from said mixed dot type; and rendering the dot regions in accordance with the selected dot type for each dot region.

6. The method of claim 5, wherein the information collected for a dot region includes information relating to at least one of contrast, variance, variation or roughness for that dot region.

7. The method of claim 5 and wherein in rendering the mixed dot type a set of threshold values S for the mixed dot is provided such that $$S = \text{the set } \{S1, S2 \ldots Sn\},$$

$$Sn = \text{Base\_Value} + M*Pn$$

wherein n is related to the number of gray levels of the digitized image signal, Base_Value is a number which varies in value with n, M=1, and Pn=Thresholding value−Base_Value.

8. The method of claim 7 and wherein in rendering the modified dot type, a set of threshold values $S_M$ is provided such that $$S_M = \text{the set } \{S_M1, S_M^2 \ldots S_M^n\},$$

$$S_M^n = \text{Base\_Value} + M*Pn$$

wherein 0<M<1.

9. The method of claim 8 and wherein a matrix set of threshold values is provided that varies pseudorandomly.

10. The method of claim 5 and wherein a matrix set of threshold values is provided that varies pseudorandomly.

11. The method of claim 10 and wherein in said rendering step the digitized image signals are compared with the threshold values and rendered by recording grey level pixels on a recording medium.

12. The method of claim 9 and wherein in said rendering step the digitized image signals are compared with the threshold values and rendered by recording grey level pixels on a recording medium.

13. The method of claim 8 and wherein in said rendering step the digitized image signals are compared with the threshold values and rendered by recording grey level pixels on a recording medium.

14. The method of claim 7 and wherein in said rendering step the digitized image signals are compared with the threshold values and rendered by recording grey level pixels on a recording medium.

15. The method of claim 6 and wherein in said rendering step the digitized image signals are compared with the threshold values and rendered by recording grey level pixels on a recording medium.

16. The method of claim 5 and wherein in said rendering step the digitized image signals are compared with the threshold values and rendered by recording grey level pixels on a recording medium.

17. An apparatus for reproducing an original image, comprising means for scanning an original image to digitize the image so as to produce a digitized image signal;

means analyzing information about a dot region from the digitized image signal;

means for selecting for each dot region of the digitized image signal a dot type to render that dot region in accordance with the information, the dot type being either a mixed dot type, a fixed threshold dot type or a dot type mathematically modified from said mixed dot type; and means for rendering the dot regions in accordance with the selected dot type for each dot region.

18. A method of reproducing an original image comprising:

scanning an original image to digitize the image so as to produce a digitized image signal; for a dot region of the digitized image signal selecting a threshold mask having a set of different threshold values, wherein an index is associated with the threshold mask and the index changes from dot region to dot region to point to different starting threshold values in the set; and rendering the dot regions in accordance with a comparison of the digitized image signal and threshold values in the set.

* * * * *